US008070010B2

(12) United States Patent
Coudurier

(10) Patent No.: US 8,070,010 B2
(45) Date of Patent: Dec. 6, 2011

(54) EASY-TO-CLEAN COOKING SURFACE

(75) Inventor: Alain Coudurier, Albens (FR)

(73) Assignee: SEB S.A., Ecully (FR)

( * ) Notice: Subject to any disclaimer, the term of this patent is extended or adjusted under 35 U.S.C. 154(b) by 204 days.

(21) Appl. No.: 12/420,153

(22) Filed: Apr. 8, 2009

(65) Prior Publication Data

US 2009/0191323 A1    Jul. 30, 2009

Related U.S. Application Data

(63) Continuation of application No. 10/539,442, filed as application No. PCT/FR03/03774 on Dec. 17, 2003, now abandoned.

(30) Foreign Application Priority Data

Dec. 20, 2002  (FR) ..................................... 02 16231

(51) Int. Cl.
*A47J 36/02*    (2006.01)

(52) U.S. Cl. .................. 220/573.1; 220/573.2; 428/660; 99/324

(58) Field of Classification Search .................. None
See application file for complete search history.

(56) References Cited

U.S. PATENT DOCUMENTS

| | | | | |
|---|---|---|---|---|
| 2,908,073 A | * | 10/1959 | Dulin .............................. | 156/172 |
| 3,106,773 A | | 10/1963 | Jaffe et al. ..................... | 228/194 |
| 3,148,038 A | | 9/1964 | Wolfe ............................ | 428/636 |
| 3,173,202 A | | 3/1965 | Farber | |
| 3,496,621 A | | 2/1970 | Winter ........................... | 428/612 |
| 5,206,093 A | * | 4/1993 | Masaki et al. ................. | 428/651 |
| 5,436,947 A | | 7/1995 | Taylor ............................ | 376/416 |
| 5,549,797 A | | 8/1996 | Hashimoto et al. ....... | 204/192.16 |
| 5,555,799 A | | 9/1996 | Amick et al. .................. | 100/313 |
| 6,197,438 B1 | * | 3/2001 | Faulkner ........................ | 428/627 |
| 2001/0054638 A1 | | 12/2001 | Hardwick ...................... | 228/107 |
| 2004/0022346 A1 | * | 2/2004 | Kim et al. ...................... | 376/305 |
| 2005/0205172 A1 | | 9/2005 | Coudurier ...................... | 148/403 |
| 2005/0249886 A1 | | 11/2005 | Ge .................................. | 427/446 |
| 2008/0081211 A1 | | 4/2008 | Tuffe et al. ..................... | 428/650 |
| 2009/0301610 A1 | * | 12/2009 | Gillon et al. ................... | 148/403 |

FOREIGN PATENT DOCUMENTS

| | | |
|---|---|---|
| EP | 0 966 910 A1 | 12/1999 |
| FR | 1120749 | 7/1956 |
| FR | 2 760 621 A1 | 9/1998 |
| JP | 1-262811 | 10/1989 |
| JP | 5-317179 | 12/1993 |
| WO | WO 03/102259 | 12/2003 |

* cited by examiner

*Primary Examiner* — John J Zimmerman
(74) *Attorney, Agent, or Firm* — Browdy and Neimark, PLLC

(57) ABSTRACT

A food cooking surface for a cooking appliance, a method of producing that surface and a method of cooking food with a cooking appliance having that food cooking surface. The food cooking surface is made of a metal alloy of zirconium and of at least another metal, the zirconium content is not less than 75 wt %. In accordance with one embodiment of the invention, the alloy contains less than 10 wt % of elements added to zirconium.

26 Claims, No Drawings

EASY-TO-CLEAN COOKING SURFACE

CROSS REFERENCE TO RELATED APPLICATIONS

The present application is a continuation of application Ser. No. 10/539,442, filed on Jun. 20, 2005, now abandoned, which is a national stage of PCT/FRO3/03774, filed on Dec. 17, 2003.

BACKGROUND OF THE INVENTION

The present invention relates to the field of articles intended for the preparation and the cooking of food and more particularly the cooking surface of these articles in contact with food to be treated.

For many years, significant efforts have been developed in order to facilitate the daily preparation of meals. Among the notable progress, coatings based on fluorocarbonated polymers as nonstick coating in kitchen utensils quickly developed since the end of the 1950's. Such coatings is universally known since the process presented in the patent FR 1120749 allowed a reliable attachment of such coatings on various metals, such as aluminum.

However, such coatings remain fragile. Thus, clever ways were developed in order to mechanically reinforce the layer on its support. Many improvement patents describe methods and means allowing the scratch resistance of such coatings to be increased, by acting on the coating and/or the substrate. Despite everything, such coatings remain sensitive to the repeated use of sharpened or pointed metallic materials, such as knives or forks.

In parallel, developments were carried out on mechanically resistant surfaces on which attempts were made to improve the ease of cleaning. Metal deposition, such chromium plating on stainless steel, quasi-crystals, or nonmetallics (silicates, . . . ) thus appeared.

Quasi-crystals are a phase or metal compound presenting, at the crystallographic level, symmetries of axial rotation of the order of 5, 8, 10 or 12, like the isocahedral and decagonal phases. Such coatings are in particular described in the patent EP 0 356 287 and have the qualities of scratch resistance, even of anti-adherence in certain cases.

BRIEF SUMMARY OF THE INVENTION

The present invention aims at remedying the above mentioned disadvantages of the prior art, by offering a cooking surface with improved characteristics of ease of cleaning, of corrosion resistance, while having a good mechanical resistance.

The present invention is achieved by a food cooking surface for a kitchen utensil or cooking apparatus, characterized in that this cooking surface is a metal alloy of zirconium and at least one other metal, and the zirconium content of which is at least 75 wt %.

DETAILED DESCRIPTION OF THE INVENTION

Metal alloys based on zirconium, such as zircaloys, are generally known for their exceptional resistance to corrosion, and their good mechanical resistance to continuous neutronic exposure, while remaining transparent to thermal neutrons. They are primarily used in the nuclear industry as an envelope for uranium oxide fuel bars. Such alloys comprise primarily zirconium with some alloy elements such as tin, iron, chromium and nickel.

Surprisingly, it was noted, during tests, that alloys of a plurality of metals and containing a majority of zirconium, also presented properties of ease of cleaning when such surfaces were used as a cooking surface and that foodstuffs remained attached to the surface, for example after a calcination of the products that were cooked. This ease of cleaning can be expressed by the possibility of easily removing elements carbonized on the cooking surface. Advantageously, the alloy contains less than 10 wt % of elements in addition to zirconium.

Such materials, of which the alloys termed zircaloys form part, are more easily obtaining because the crystallization conditions are less disturbed by alloy elements in small amounts.

According to a first mode of implementing the invention, the food cooking surface for a kitchen utensil or a cooking appliance is obtained by depositing a suitable thickness of metallic material on a substrate. This deposition can be carried out by one or the other of the following processes: thermal projection of a powder of an adequate granulometry, deposition by electrophoresis of a micro or submicronic powder, cathode sputtering of a massive target. In this last case the target can be obtained by assembly on a copper substrate of one or more sheets or material plates having the desired composition, the aforementioned sheets or plates being obtained either by powder sintering or thermal projection of powder, or resulting from casting. Generally, all the techniques of physical vapor deposition can be used. Other techniques, such as hot compaction or electrolytic deposition also can be used.

This implementation has the advantage of using a small amount of material and of being able to regulate a low thickness of material on the substrate in order to produce the cooking surface.

All these techniques make it possible, in addition, to obtain deposits having strong cohesion with the substrate on which they are deposited. The risks of separation of the deposit during use are thus minimized.

According to a second mode of implementation of the invention, the food cooking surface for a kitchen utensil or a cooking appliance is obtained by assembly of a crystalline metal sheet having the desired composition on a substrate. This implementation has the advantage of approaching the known implementations of assembly of metals, which makes it possible to be able to adapt known techniques without significant specific development.

The zirconium alloy sheets can be obtained by techniques known in metallurgy, such rolling of an ingot resulting from melting of a mixture of metals.

The assembly of the sheet on the substrate can be carried out by one of the following techniques: colaminating, brazing, hot striking, in a way known per se. Plating by explosion also can be considered.

Advantageously, the sheet and the substrate undergo, after assembly, a stage of working by stamping. The substrate can be composed of one or several metal sheet(s) of the following materials: aluminum, stainless steel, cast iron, steel, copper.

Other advantages resulting from the tests will appear from reading the description which will follow, in relation to an illustrative example of the present invention given as a non-limiting example.

The example of realization of the invention relates to a deposition by PVD, of an alloy called zircaloy 2 (1.5 wt % of tin, 0.14 wt % of iron, 0.10 wt % of chromium and 0.05 wt % of nickel) on stainless steel. One face of this deposit underwent an extensive polishing, close to optical polishing, before the performance of tests, in order to make it comparable with other cooking surfaces so that the tests for evaluation of the ease of cleaning such a surface, in a domestic cooking use, can be compared.

The system for evaluation of the ease of cleaning makes it possible to quantify the capabilities of a cooking surface to return to its original aspect after use. This evaluation system comprises the following steps:

the surface is locally covered with a food mixture of known composition, this mixture is carbonized in an oven under defined conditions, for example 210° C. during 20 minutes, after cooling, surface is put to soak during a controlled time in a mixture of water and of detergent, an abrasive pad is then applied under a defined constraint using an abrading apparatus (plynometer) on the soiled surface in a back and forth movement during a given number of cycles, the percentage of correctly cleaned surface is noted and characterizes the ease of cleaning of the cooking surface.

The tests carried out on various types of surface thus make it possible to comparatively evaluate the quality of surfaces as to their ease of cleaning.

Of course, the tests are carried out by respecting the same parameters for each step of the evaluation system: same food mixture, same surface of application the food mixture, same carbonization temperature, . . . .

The following comparative table shows the results obtained on three different cooking surfaces, namely polished stainless steel, quasi-crystals, and the zircaloy 2 alloy deposited on stainless steel such as previously described, after polishing, in a severe test with a food composition based on milk and rice considered to be difficult to clean once carbonized. Such a test thus makes it possible to highlight well the differences between the cleaning quality of the surfaces.

|  | polished stainless steel | Quasi-crystals | polished Zircaloy 2 on stainless steel |
| --- | --- | --- | --- |
| Quantity of carbonized residue removed | 30% | 40% | 80% |

The table shows without ambiguity the very interesting results obtained with the alloy zircaloy 2 deposited on stainless steel. Other tests led on an aluminum base show similar results.

It is to be noted that the number of abrasion cycles on the plynometer was fixed at 15. This small number of cycles highlights well the quality of ease of cleaning of the surface according to the invention since there remains no more than 20% of the surface soiled after 15 back and forth passes of the abrasive pad.

Repetitive tests after complete cleaning of the surface show that the ease of cleaning of the alloy presented is not altered.

Advantageously, during the deposition process, nitriding of the layer is carried out by the addition of nitrogen. Such a nitriding also can be envisioned during a development of the different layer, by an appropriate heat treatment following development of said layer. Such a nitriding makes it possible to increase the hardness of the layer, which confers on the cooking surface a better abrasion resistance.

Other techniques of heat treatment can be employed to increase the hardness of the alloy. For the zircaloy alloys, one can use the water quenching/tempering from the field b. One can also use solid phase tempering by laser or equivalent.

When the implementation of the invention implies the use of a substrate, the latter is then composed of one or more metal sheet(s) of the following materials: aluminum, stainless steel, cast iron, steel, copper. However, the present invention is not limited to the realization of a layer small thickness of a crystalline metal compound such as previously described, deposited or assembled on a thick substrate, but also aims at the realization of massive material, with or without a substrate, the latter, when it is present, not having a role of mechanical support for the layer, but assuring another function, such as the thermal distribution of heat for a utensil placed on a heat source (frying pan, sauce pans . . . ).

What is claimed is:

1. A frying pan or sauce pan comprising: a frying pan or sauce pan body; a handle attached to, and extending from, said body; and a food contacting surface adhered to a surface of said body and constituting a cooking surface, characterized in that this cooking surface is a metal alloy of zirconium and at least one other metal, and the zirconium content of which is at least 75 wt %.

2. A frying pan or sauce pan according to claim 1, characterized in that the alloy contains less than 10 wt % of elements in addition to the zirconium.

3. A frying pan or sauce pan according to claim 2, characterized in that it is obtained by the deposit of metallic material on a substrate.

4. A frying pan or sauce pan according to claim 3, characterized in that the deposit is carried out by cathode sputtering of a massive target.

5. A frying pan or sauce pan according to claim 4, characterized in that the target is obtained by assembly on a copper substrate of one or more sheets or plates of material having the desired composition, said sheets or plates being obtained either by powder sintering or thermal powder projection, or resulting from casting.

6. A frying pan or sauce pan according to claim 2, characterized in that it is obtained by assembly of a crystalline metal sheet on a substrate.

7. A frying pan or sauce pan according to claim 6, characterized in that the sheet is obtained by rolling of an ingot resulting from melting of a mixture of metals.

8. A frying pan or sauce pan according to claim 7, characterized in that the assembly is carried out by one of the following techniques: colaminating, brazing, hot striking.

9. A frying pan or sauce pan according to claim 8, characterized in that the sheet and the substrate undergo, after assembly, a step of working by stamping.

10. A frying pan or sauce pan according to claim 9, characterized in that the substrate is composed of one or more metal sheet(s) of the following materials: aluminum, stainless steel, cast iron, steel, copper.

11. A frying pan or sauce pan according to claim 8, characterized in that the substrate is composed of one or more metal sheet(s) of the following materials: aluminum, stainless steel, cast iron, steel, copper.

12. A frying pan or sauce pan according to claim 8, characterized in that the sheet and the substrate undergo, after assembly, a step of working by stamping.

13. A frying pan or sauce pan according to claim 7, characterized in that the sheet and the substrate undergo, after assembly, a step of working by stamping.

14. A frying pan or sauce pan according to claim 7, characterized in that the substrate is composed of one or more metal sheet(s) of the following materials: aluminum, stainless steel, cast iron, steel, copper.

15. A frying pan or sauce pan according to claim 6, characterized in that the assembly is carried out by one of the following techniques: colaminating, brazing, hot striking.

16. A frying pan or sauce pan according to claim 6, characterized in that the sheet and the substrate undergo, after assembly, a step of working by stamping.

17. A frying pan or sauce pan according to claim 6, characterized in that the substrate is composed of one or more metal sheet(s) of the following materials: aluminum, stainless steel, cast iron, steel, copper.

18. A frying pan or sauce pan according to claim 5, characterized in that the substrate is composed of one or more metal sheet(s) of the following materials: aluminum, stainless steel, cast iron, steel, copper.

19. A frying pan or sauce pan according to claim 4, characterized in that the substrate is composed of one or more metal sheet(s) of the following materials: aluminum, stainless steel, cast iron, steel, copper.

20. A frying pan or sauce pan according to claim 2, characterized in that the substrate is composed of one or more metal sheet(s) of the following materials: aluminum, stainless steel, cast iron, steel, copper.

21. A frying pan or sauce pan according to claim 1, characterized in that it is obtained by the deposit of a metallic material on a substrate.

22. A frying pan or sauce pan according to claim 1, characterized in that it is obtained by assembly of a crystalline metal sheet on a substrate.

23. A method for cooking food comprising:
providing a cooking appliance comprising an appliance body and a food contacting surface adhered to a surface of said body and constituting a cooking surface, characterized in that this cooking surface is a metal alloy of zirconium and at least one other metal, and the zirconium content of which is at least 75 wt %;
heating the cooking appliance and placing food on the cooking surface; and
removing the food from the cooking appliance after cooking of the food has been completed.

24. The method according to claim 23, wherein the alloy contains less than 10 wt % of elements in addition to the zirconium.

25. The method according to claim 23, wherein said step of providing a cooking appliance comprises:
providing a cooking appliance body composed at least partially of a metal substrate; and
securing a layer or sheet of a metal alloy of zirconium and at least one other metal to the substrate, the zirconium content of the alloy being at least 75 wt %, the layer or sheet forming the food contacting surface and being easy to clean.

26. A cooking pan comprising: a cooking pan body; a handle attached to, and extending from, said body; and a food contacting surface adhered to a surface of said body and constituting a cooking surface, characterized in that this cooking surface is a metal alloy of zirconium and at least one other metal, and the zirconium content of which is at least 75 wt %.

* * * * *